Patented May 12, 1953

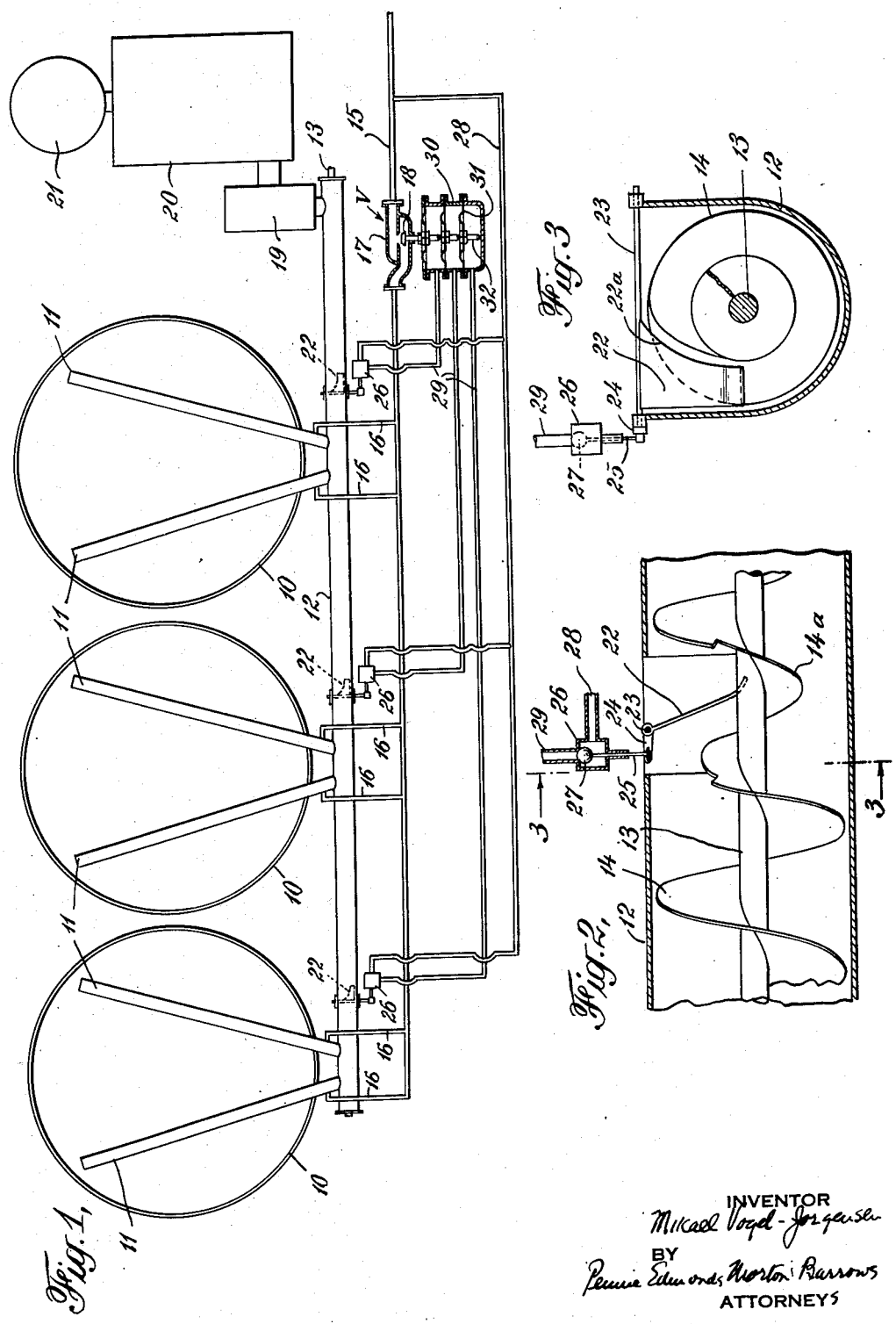

2,638,385

UNITED STATES PATENT OFFICE 2,638,385

CONVEYING APPARATUS

Mikael Vogel-Jorgensen, Copenhagen, Denmark, assignor to F. L. Smidth & Co., New York, N. Y., a corporation of New Jersey Application August 5, 1947, Serial No. 766,157
In Denmark October 20, 1943

Section 1, Public Law 690, August 8, 1946
Patent expires October 20, 1963

7 Claims. (Cl. 302—11)

This invention relates to conveying systems used for conveying pulverulent material from a container to a place where the material is to be utilized, packed, etc. More particularly, the invention is concerned with a novel conveying system for conveying pulverulent material from a container provided with discharge means, the system including means acting in response to an overcharge in the conveyor to reduce the effectiveness of the discharge means. The new system may be used to particular advantage for the conveying of cement from one or more silos provided with pneumatic discharge means, and such a form of the system will be illustrated and described for purposes of explanation.

It is well known that pulverulent material does not discharge at a uniform rate through the outlet of a silo because of slides in the material and, if air is introduced into the material within the silo to facilitate its discharge, the sliding of the material is likely to cause surges through the outlet. If the material is discharged from the outlet into a conveyor, such surging frequently overcharges the conveyor and, in the case of a worm conveyor, overcharging may cause a stoppage of the worm or breakage of the worm casing, and the pulverulent material may penetrate into the intermediate bearings for the worm. The introduction into a worm conveyor of an overcharge is thus liable to require that the conveyor be shut down, so that it can be cleared of material and, if necessary, repaired. Even if the overcharging of the conveyor does not damage the latter, it may result in feeding of the material at an excessive rate to the machine, such as packing apparatus, to which the conveyor delivers the material, and such excessive feeding may interfere with the operation of the machine and, in some cases, cause damage.

The present invention is, accordingly, directed to the provision of a conveying system, which includes a conveyor receiving material from a container and provided with means by which overcharging of the conveyor is prevented. In the preferred form, the new system includes an element, which is in contact with the material in the conveyor and acts upon actuation by an overcharge of material, to reduce the effectiveness of the means, by which the material is removed from the container and delivered into the conveyor. The element may have the form of a paddle contacting the material in the conveyor and, when the container is provided with pneumatic means for removing material therefrom, the element may control the supply of fluid to the pneumatic means. If desired, the supply of fluid to the removing means may be controlled by a diaphragm operated valve and the element may operate another valve which controls the supply of fluid to the diaphragm. When the element is moved because of the introduction of an overcharge of material into the conveyor, it operates to vary the supply of fluid acting on the diaphragm, and this, in turn, causes the valve, through which fluid is supplied to the removing means, to be closed partially or entirely. When the system includes a conveyor receiving material from a number of containers, there is an element for each container disposed adjacent to and beyond the point of discharge from that container into the conveyor. The actuation by any one of the elements because of an overcharge may then reduce the effectiveness of the removing means in its container or of the removing means in all the containers.

The new conveying system delivers material at a substantially constant rate and, because stoppages in operation and damage to the system resulting from overcharges are avoided, the system operates with improved economy and at increased capacity. In the new system, the conveyor may be of the type in which the material is moved in a trough or a closed channel and the element is then disposed within the trough or channel and makes contact with the stream of material therein.

For a better understanding of the invention, reference may be made to the accompanying drawing, in which Fig. 1 is a diagrammatic view, with parts shown in section, of one form of the new conveying system;

Fig. 2 is a longitudinal sectional view through a part of the conveyor; and

Fig. 3 is a sectional view on the line 3—3 of Fig. 2.

The system illustrated is employed for the purpose of transporting material from a plurality of silos 10, of which three are shown. Each silo includes a pair of pneumatic devices 11 for removing the material from the silo and delivering it into a conveyor. These devices may be of a known type in which air is introduced into the material to render it fluent, an example of such a device being disclosed in British Patent 607,009, accepted August 24, 1948. The conveyor includes a channel 12 with a closed top and a shaft 13 extending through the channel and provided with screw flights 14. Air is supplied to the devices 11 through a supply line 15 provided with branches 16 leading to the respective devices. The flow of air through line 15 to the devices is controlled by a valve V, which includes a casing 17 and a valve body 18 having a stem, which projects through the wall of the casing. The conveyor delivers the material to any selected point of discharge and the system illustrated shows the conveyor delivering the material to an elevator 19, which supplies the material to the feeding device 20 of a packing machine 21.

A paddle 22 extends into the channel of the conveyor adjacent to and beyond the point of discharge from each silo. The paddle is mounted on a shaft 23 extending across the channel and supported for rocking movement on the upper edges of the channel. The paddle is mounted adjacent one side wall of the channel and has a curved side edge 22a facing shaft 13. The flights on the shaft are cut away adjacent the paddle, as indicated at 14a, so that the paddle will not be struck by the flights as shaft 14 rotates. The shaft carries an arm 24, which is attached to a rod 25 extending into a chamber 26 and engaging a ball 27 within the chamber. Air is supplied to casing 26 through a branch 28 from air line 15, and the casing has an outlet 29, which leads into a diaphragm chamber 30. The chamber 30 includes a plurality of diaphragms 31, one for each of the elements 22 and the outlet lines 29 from the casings 26 lead to spaces within casing 30 below respective diaphragms 31. Each diaphragm has a stud 32 extending downwardly from its undersurface and the top diaphragm engages the stem of valve 18.

In the operation of the apparatus, air is supplied through line 15 and branches 16 to the devices 11, the valve 18 being normally unseated. The material discharged from the silos enters the conveyor and is carried along by the flights on shaft 13. So long as the conveyor contains a normal load, each of the elements 22 extends downwardly, as indicated in Fig. 2, and acts through arm 24 and rod 25 to hold ball 27 seated to prevent the passage of air through casing 26. Whenever an overcharge of material is delivered from a silo into the conveyor, the level of the material in channel 12 rises and the element 22 adjacent the silo, from which the overload was delivered, is swung counter-clockwise, so that its ball 27 is unseated and air can flow from line 28 through casing 26 and outlet 29 into casing 30 below one of the diaphragms. The pressure of the air causes the diaphragm above the space into which the air was admitted to bulge upwardly and, as a result, valve 18 is seated and the supply of air to the devices 11 in the silos is cut off. The air admitted into casing 30 tends to bulge downwardly the diaphragm defining the bottom of the space into which air was admitted through casing 26, but the downward movement of the diaphragm is prevented by the studs 32. When the supply of air to the devices 11 is cut off, the flow of material into the conveyor diminishes. When the level of the material in channel 12 has been restored to normal, the element or elements 22, that were raised by the overcharge, swings back to normal and the supply of air to the diaphragm casing 30 is cut off. Thereupon valve V opens and air is again supplied to the devices 11 to restore them to normal operation.

I claim:

1. A conveying system for pulverulent material comprising a plurality of containers for the material, means extending from the interior of each container to the outside thereof for removing the material from the container, a conveyor for receiving the material removed from the containers, means for controlling the operation of the removing means, and means disposed adjacent to and beyond the points of delivery of the material from each container to the conveyor and acted upon by the material being advanced by the conveyor to cause the control means to reduce the effectiveness of the removing means for all of the containers, when the conveyor is advancing an overcharge of material at any of the locations of the said means disposed adjacent to and beyond the points of delivery.

2. A conveying system for pulverulent material as set forth in claim 1 in which the means for causing the control means to reduce the effectiveness of the removing means for all of the conveyors is an element positioned to be in contact with material being advanced by said conveyor and to be moved to cause actuation of the control means by an overcharge of material being conveyed.

3. A conveying system for pulverulent material as set forth in claim 1 in which the means for removing the material from each container extends along the bottom thereof.

4. A conveying system for pulverulent material as set forth in claim 1 in which the means for moving the material from the containers to the outside thereof is pneumatically activated and the means for controlling the operation of the removing means regulates the supply of air to the pneumatically activated removing means.

5. A conveying system for pulverulent material as set forth in claim 4 in which the means moving the material from each container extends along the bottom thereof.

6. A conveying system for pulverulent material as set forth in claim 4 in which the controlling means for the removing means is pneumatically operated.

7. A conveying system for pulverulent material as set forth in claim 4 in which the means for causing the control means to reduce the effectiveness of the removing means for all of the conveyors is an element positioned to be in contact with material being advanced by said conveyor and to be moved to cause actuation of the control means by an overcharge of material being conveyed, the controlling means for the removing means is pneumatically operated and said element controls the supply of air to said controlling means.

MIKAEL VOGEL-JORGENSEN.

References Cited in the file of this patent

UNITED STATES PATENTS

| Number | Name | Date |
|---|---|---|
| 1,419,946 | Schaffer | June 20, 1922 |
| 1,778,393 | Klugh | Oct. 14, 1930 |
| 2,014,617 | Fischer | Sept. 17, 1935 |
| 2,111,663 | Graemiger | Mar. 22, 1938 |
| 2,565,835 | Adams | Aug. 28, 1951 |